Aug. 14, 1951     H. C. MEADOR ET AL     2,564,168
VALVE

Filed Aug. 18, 1944     2 Sheets-Sheet 1

Horace C. Meador
Madden T. Works
INVENTORS

Aug. 14, 1951  H. C. MEADOR ET AL  2,564,168
VALVE
Filed Aug. 18, 1944  2 Sheets-Sheet 2

Horace C. Meador
Madden T. Works
INVENTORS

Patented Aug. 14, 1951

2,564,168

UNITED STATES PATENT OFFICE 2,564,168

VALVE

Horace C. Meador and Madden T. Works, Houston, Tex., assignors to Cameron Iron Works, Houston, Tex., a corporation of Texas Application August 18, 1944, Serial No. 549,998

5 Claims. (Cl. 251—50)

This invention relates to valves, and more particularly to easily operable and highly effective valves for controlling the flow of fluids under high pressure.

An inherent difficulty with high pressure valves as heretofore constructed is the fact that the valve body and seat are always distorted by the high pressures to which they are subjected, with the result that no matter how carefully and accurately the valve seat may have been machined, when such distortion takes place, the valve or closure member will no longer fit the seat, and it is necessary to apply great force to obtain a complete closing of the valve. This consequently requires the application of great force to unseat or open the valve, since the parts, having been distorted and forced together, have a marked tendency to stick. Making the walls of the body heavier has been resorted to to reduce such distortion, but this is expensive and undesirable, and can only serve to reduce and never to eliminate distortion.

It is the general object of the present invention to provide means for preventing such distortion of the valve seat by high pressures exerted thereon, so that the valve or closure member will properly engage the seat under all conditions, and may be tightly closed and freely opened without the necessity for applying any excessive force.

To this end the invention contemplates the provision of a separately formed seat member mounted in the valve body and loosely fitted therein, and sealed thereto by means of flexible or yieldable packing. In this way the valve seat is relieved of all unbalanced fluid pressure, since the pressure is exerted both inside and outside of the seat member. As a result, there are no forces tending to distort the valve seat, and the valve body itself may flex or distort under the influence of the fluid pressures, independently of the valve seat, so that such distortion of the valve body does not affect the proper closing of the valve.

A further object is to provide a valve structure having a valve seat which may be easily and accurately machined.

A further object of the invention is to devise improved means whereby plastic packing material may be introduced into the valve body, and whereby this packing material, introduced at a single point, is so distributed as to provide means not only for sealing the valve stem, but also means for sealing the seat member and associated parts within the valve body.

In order that the invention may be readily understood, reference is had, by way of illustration, to the accompanying drawings forming part of this specification and in which.

Figure 3:
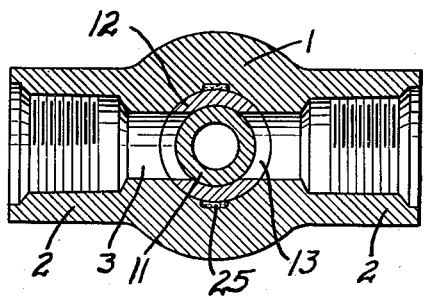
Fig. 3 is a transverse section substantially on the line 3—3 of Fig. 2.
Figure 1:
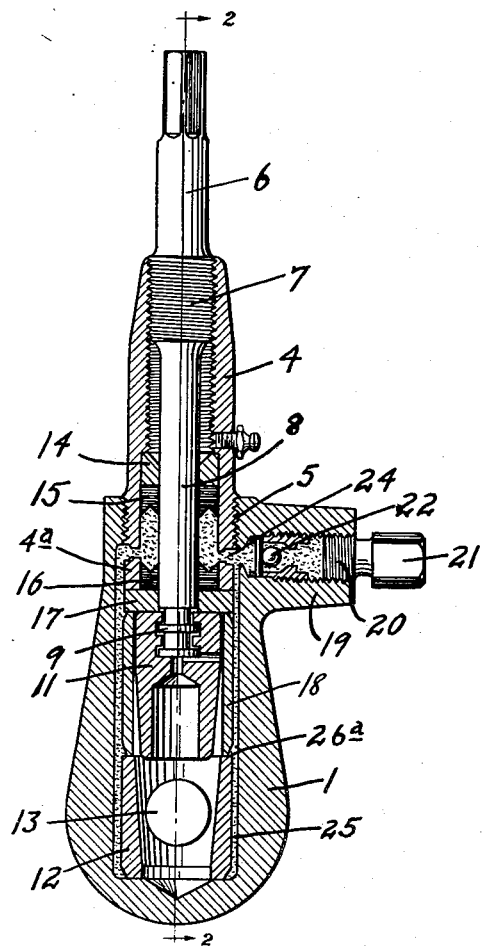
Fig. 1 is a longitudinal section, substantially on the line 1—1 of Fig. 2, showing one form of valve embodying the invention.
Figure 2:
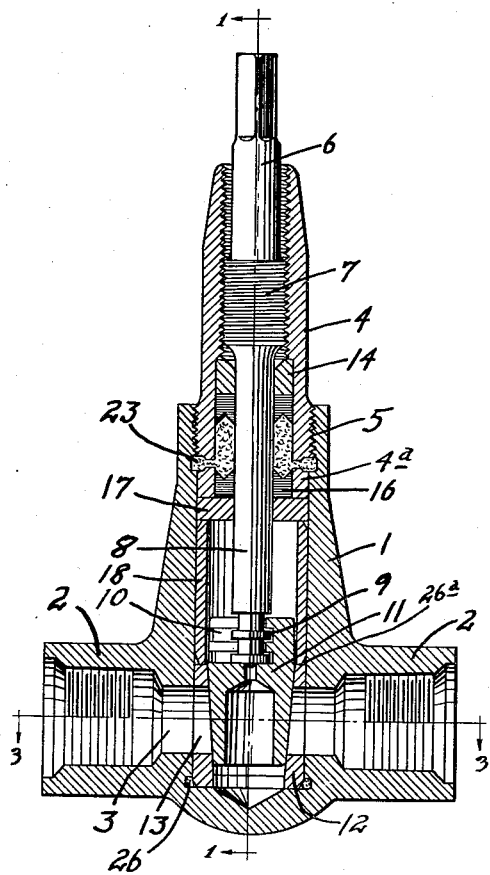
Fig. 2 is a similar section substantially on the line 2—2 of Fig. 1.

Referring to the drawings in detail, and more particularly first to Figs. 1–3 thereof, 1 designates the body of the valve, which may be of the usual or any desired construction and is provided with opposite pipe connections or sockets 2, constituting the inlet and outlet. An opening 3 extends through the body of the valve in line with these sockets.

A bonnet 4 is threaded into the end of the body as at 5 and a stem 6 has a threaded engagement at 7 with the interior of this bonnet.

The valve illustrated in these figures is of the gate type. The inner end of the stem 8 is provided with one or more annular collars 9 which turn freely within corresponding annular grooves 10 formed in a closure member or plug 11.

This closure member 11 is shown as tapered or conical and is adapted to engage a similar tapered opening in a separately formed hollow seat member 12 mounted in the valve body. This seat member is provided with an opening 13 extending therethrough, which opening substantially registers with the opening 3 in the valve body. The seat member 12 fits more or less loosely within the body of the valve and is yieldably sealed within it, as hereinafter described. The closure member is preferably made hollow as shown, and both it and the seat member 12 are made thin enough so that they are mutually flexible when brought together and will readily flex to fit each other. This eliminates the necessity for accurately grinding and fitting these parts together.

A washer 14 surrounds the valve stem within the bonnet 4, and inwardly of this washer and also surrounding the valve stem are a pair of spaced cut-type sealing rings 15 and 16, while inwardly of the ring 16 is another washer 17.

This washer 17 bears upon one end of a spacing sleeve 18 which surrounds the plug 11, the other end of which sleeve engages the end of the seat member 12.

Projecting from the side of the valve body is a chamber 19 into the open outer end of which is threaded a screw plug 20 having a polygonal head 21, by which it may be turned, and constituting a ram. An inwardly opening check valve 22 is mounted within this chamber and the chamber communicates at its inner end with an annular groove 23 formed in the inner wall of the valve body, which groove communicates through a series of openings 24 with the space between the sealing rings 15 and 16 around the valve stem 8.

Longitudinal channels 25 extend along the interior of the valve body from the groove 23 past the sides of the spacing sleeve 18 and the seat member 12, these channels communicating at their extreme ends with an annular groove 26 extending around the lower end of the seat member 12. The channels 25 are also interconnected at the upper end of the seat member by the annular space 26a, formed by a tapered surface on the lower outer end surface of the spacing sleeve 18.

In assembling the valve, the inner end 4a of the bonnet bears upon the washer 17, which in turn bears upon the spacing sleeve 18, which engages the seat member 12, thus holding the parts in proper relation.

The ram 20 is removed and suitable plastic packing material relatively softer than the seat member 12 is introduced into the chamber 19. Upon inserting and screwing up the ram, this material is forced inward past the check valve 22, from which point part of it passes through the openings 24 into the space around the stem 8 between the sealing rings 15 and 16, while another portion enters the annular groove 23 to form a seal between the bonnet 4 and the body 1, and thence passes through the grooves 25 along the sides of the spacing sleeve 18 and seat member 12, to and into the annular groove 26 surrounding the end of such seat member at its lower end and the annular space 26a adjacent the upper end of the seat member. It will be understood that after the ram 20 has been screwed in as far as desired, it may be removed and an additional amount of plastic packing introduced. The ram may be then replaced and again screwed up so as to force the additional packing material into the spaces and grooves above described. This operation may be repeated as often as necessary, the check valve 22 preventing the plastic packing from flowing out when the ram is removed. The introduction of plastic packing is continued until all of the spaces and grooves, above described, are completely filled. Thus, plastic packing, introduced at a single point, is conducted to a number of different points within the valve body and provides a flexible or yieldable seal, not only around the valve stem, but also between the bonnet and the body, between the spacing sleeve and the valve body and between the seat member and the valve body along both sides and around both ends of the seat member.

After the grooves 25 and 26 have been filled with plastic packing as described, it will be seen that the seat member 12 is mounted within the valve body by means of a flexible or yieldable seal, which renders the seat member entirely independent of the valve body so far as distortion is concerned. It will be apparent that the valve body may flex or distort, under high pressure, without affecting the seat member. It will be further apparent that the fluid pressure surrounds the seat member 12 on all sides and hence is balanced. Thus, such fluid pressure, no matter how high, can have no distorting effect on the seat member.

The plug or closure member 11 is more or less freely suspended by the collars and grooves 9 and 10 and thus floats freely and can readily adapt itself to any slight changes in position of the seat member 12, due to yielding of the flexible packing.

Hence it will be understood that neither the closure member 11 or seat member 12 is rigidly secured to any support, but that these members constitute a free floating pair. As a result, the closure member when moved to valve closing position, snugly engages the seat member, without the application of any undue force, and will close tightly, without sticking, and without requiring any great force to disengage the same.

Figure 6:
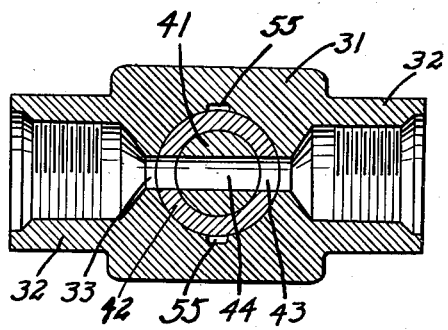
Fig. 6 is a transverse section substantially on the line 6—6 of Fig. 5.
Figure 4:
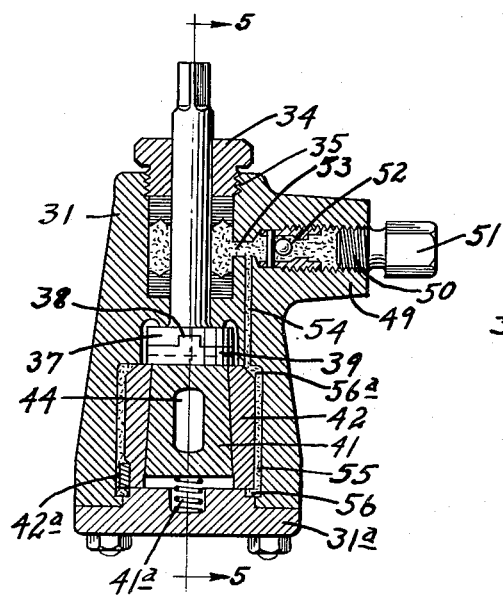
Fig. 4 is a longitudinal section, substantially on the line 4—4 of Fig. 5, showing another form of valve embodying the invention.
Figure 5:
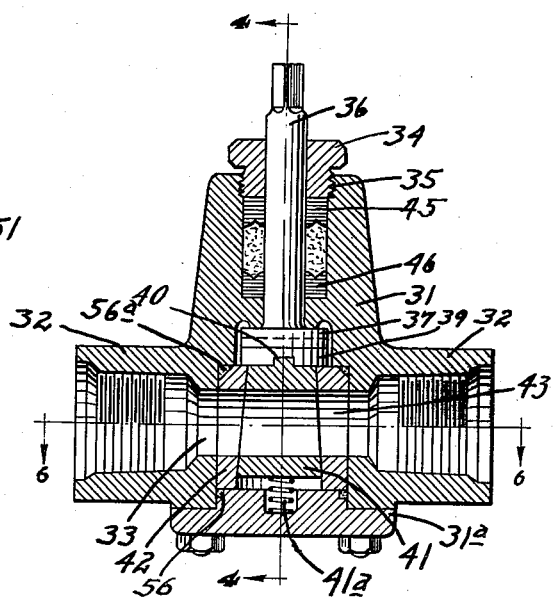
Fig. 5 is a similar section, substantially on the line 5—5 of Fig. 4.

While we have shown and described the invention as applied to a valve of the gate type, it is by no means limited to valves of this type, but is also applicable to other types of valves, as for example the ordinary plug valve illustrated in Figs. 4, 5 and 6.

Referring to these figures, 31 designates the body of the valve, which is provided with the usual oppositely disposed pipe connections or sockets 32 connected by an opening 33. The usual gland nut 34 surrounds the stem 36 and is threaded into the body at 35.

In order to provide for free universal movement of the plug, the inner end 37 of the valve stem 36 is provided with a keyway engaging a key or rib 38 formed on an intermediate member 39, which itself has a keyway, at right angles to the first, engaging a key or rib 40 on the end of the usual plug, which is designated 41.

The seat member is shown at 42. It is provided with a transverse opening 43 substantially registering with the opening 33 and is formed with a tapered interior seat, against which the plug 41 is yieldingly held by a spring 41a supported in the usual closure plate 31a. The plug 41 has the usual transverse opening 44 adapted to be brought into and out of registry with the opening 43 in the seat member. The seat member is held against rotation within the body by suitable locking means such as the key 42a.

Sealing rings 45 and 46 surround the valve stem as before, these rings being spaced apart to provide for the reception of the plastic packing. A chamber 49 projects from the valve body, as in the other figures and is fitted with a screw plug or ram 50 having a head 51. The chamber contains a check valve 52 and communicates through an opening 53 with the space between the sealing rings 45 and 46. A passageway 54 extends longitudinally of the body from the chamber 49 and communicates with grooves 55 extending along side of the seat member 42. These grooves are connected at their extreme ends by an annular groove 56 in the body at the lower end of the seat, and an annular space 56a formed by the beveled portion of the seat member at its upper end, which groove and annular space both surround the seat member.

As in the other figures, plastic packing introduced into the chamber 49 and forced inwardly by means of the ram 50, passes not only into the space between the sealing rings 45 and 46, but also flows through the passageway 54 into channels 55 and annular groove 56 and space 56a, thus providing a flexible or yieldable seal between the seat member 42 and the body of the valve both along each side of the seat member and about both ends thereof.

By virtue of the intermediate actuating member 39, the plug 41 is substantially free floating and capable of universal movement with respect to the stem 36, so that it may readily adapt itself to any slight displacement of the seat member 42, and will seat perfectly in the same under all conditions.

As in the preceding figures, the valve body is free to flex or distort without affecting the seat member, and since the fluid pressure is exerted on all sides of the seat member, there is no tendency for such member itself to be distorted by the pressure, no matter how high.

It will be appreciated that while the seat member is not fitted tightly within the valve body, only sufficient looseness or play is permitted to make it possible for the valve body to freely flex by the amount to be expected under the pressures for which the valve is designed. In the case of small size valves this will usually be of the order of a few thousandths of an inch.

It will thus be seen that the invention provides an improved valve construction in which all danger of distortion of the valve seat by high fluid pressure is eliminated and that by reason of the yieldable seal and free floating arrangement described, the closure member will properly engage the seat member under all conditions and will close tightly and open freely without the application of excessive force.

What we claim is:

1. In a valve, a tubular seat member within a housing, said tubular member so dimensioned relative the housing as to provide radial clearance between the outside of the member and the inside of the housing, means for introducing flowable sealing material into said clearance, registering apertures in the wall of the tubular member and the housing forming a passageway extending radially outward from the bore of the tubular member, and a closure member in sealing relation with the bore of the tubular member to close said passageway.

2. A valve as in claim 1 wherein said tubular seat member is distortable to conform to the closure member.

3. In a valve, a tubular seat member within a housing, said tubular member so dimensioned relative the housing as to provide radial clearance between the outside of the member and the inside of the housing, a reservoir communicating with said clearance, flowable, sealing material in said reservoir, a device operable to reduce the volume of the reservoir thereby to force said sealing material into the clearance and maintain it under pressure, registering apertures in the wall of the tubular member and the housing forming a passageway extending radially outward from the bore of the tubular member, and a closure member in seating relation with the bore of the tubular member to close said passageway.

4. In a valve, a hollow seat member within a housing, said seat member so dimensioned relative to the housing as to provide a radial clearance space between the outside surface of the seat member and the inside surface of the housing, registering apertures in the wall of the seat member and the housing forming a transverse passageway extending outwardly from the bore of the said member, a channel between the seat member and housing encircling the registering apertures thereof and pressure sealing means in said channel, and a closure within the bore of the seat member to close said passageway.

5. In a valve, a housing having a transverse passageway therethrough, an apertured seat and a frusto conical closure member, the former positioned in and so dimensioned relative to the housing as to provide a radial clearance space between the outside surface of the seat member and the inside surface of the housing, the inner surface of the seat conforming to the tapered outer contour of the closure, said apertures of the seat and closure members adapted to register with the transverse passageway in the housing when the valve is in an open position, a channel between the seat member and housing encircling the registering apertures thereof and pressure sealing means in said channel.

HORACE C. MEADOR.
MADDEN T. WORKS.

REFERENCES CITED

The following references are of record in the file of this patent:

UNITED STATES PATENTS

| Number | Name | Date |
|---|---|---|
| 249,612 | Grinnell | Nov. 15, 1881 |
| 948,404 | Webb | Feb. 8, 1910 |
| 1,001,970 | McCarthy | Aug. 29, 1911 |
| 1,092,421 | Anderson | Apr. 7, 1914 |
| 1,586,345 | Wilson | May 25, 1926 |
| 1,935,899 | Yarnall | Nov. 21, 1933 |
| 1,985,382 | Schachter | Dec. 25, 1934 |
| 2,078,903 | Domack | Apr. 27, 1937 |
| 2,192,339 | Wilson | Mar. 5, 1940 |
| 2,308,399 | Strecker | June 12, 1943 |
| 2,356,630 | Strecker | Aug. 22, 1944 |

FOREIGN PATENTS

| Number | Country | Date |
|---|---|---|
| 9,597 | Great Britain | of 1908 |